United States Patent
Zhai et al.

(10) Patent No.: US 9,729,870 B2
(45) Date of Patent: Aug. 8, 2017

(54) VIDEO CODING EFFICIENCY WITH CAMERA METADATA

(71) Applicant: Apple Inc., Cupertino, CA (US)

(72) Inventors: Jiefu Zhai, San Jose, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 13/686,805

(22) Filed: Nov. 27, 2012

(65) Prior Publication Data

US 2013/0195183 A1  Aug. 1, 2013

Related U.S. Application Data (60) Provisional application No. 61/593,192, filed on Jan. 31, 2012.

(51) Int. Cl.
| | |
|---|---|
| *H04N 7/26* | (2006.01) |
| *H04N 19/50* | (2014.01) |
| *H04N 19/172* | (2014.01) |
| *H04N 19/117* | (2014.01) |
| *H04N 19/162* | (2014.01) |
| H04N 19/85 | (2014.01) |

(52) U.S. Cl.
CPC ..... *H04N 19/00569* (2013.01); *H04N 19/117* (2014.11); *H04N 19/162* (2014.11); *H04N 19/172* (2014.11); *H04N 19/85* (2014.11)

(58) Field of Classification Search
CPC .......... H04N 19/61; H04N 19/105; H04N 19/00569; H04N 19/172; H04N 19/162; H04N 19/117; H04N 19/85
USPC .................................. 375/240.12
See application file for complete search history.

(56) References Cited

U.S. PATENT DOCUMENTS

| | | | |
|---|---|---|---|
| 8,077,219 B2 | 12/2011 | Delva et al. | |
| 8,249,373 B2* | 8/2012 | Nagaoka | 382/238 |
| 2006/0291557 A1* | 12/2006 | Tourapis | H04N 19/46 375/240.12 |
| 2010/0104016 A1* | 4/2010 | Aoki | 375/240.16 |
| 2010/0118940 A1* | 5/2010 | Yin | H04N 19/105 375/240.12 |
| 2011/0103464 A1* | 5/2011 | Zheng | H04N 19/176 375/240.02 |
| 2011/0109753 A1* | 5/2011 | Srinivasamurthy | H04N 19/46 348/208.4 |
| 2011/0222601 A1* | 9/2011 | Suzuki | H04N 19/51 375/240.12 |
| 2011/0243224 A1 | 10/2011 | Su et al. | |

(Continued)

OTHER PUBLICATIONS

Segall et al., Video Coding for the Mobile Capture of Higher Dynamic Range Image Sequences, May 6-8, 2009, Picture Coding Symposium, pp. 1-4.*

*Primary Examiner* — Francis G Geroleo
(74) *Attorney, Agent, or Firm* — Baker Hostetler LLP; Robert L. Hails (57) ABSTRACT

A system and method for using camera capture settings and related metadata to estimate the parameters for encoding a frame of the captured video data and to modify reference frames to accommodate detected camera setting changes. Global brightness and color changes in video capture may be modeled by performing a sequence of transform operations on the reference frames to further improve the coding efficiency of a video coding system.

33 Claims, 6 Drawing Sheets

(56) References Cited

U.S. PATENT DOCUMENTS

| | | |
|---|---|---|
| 2011/0249742 A1 | 10/2011 | Price et al. |
| 2012/0050474 A1* | 3/2012 | Segall ..................... G06T 5/50 348/43 |
| 2012/0195372 A1* | 8/2012 | Zhai et al. ............... 375/240.03 |
| 2012/0207214 A1* | 8/2012 | Zhou et al. .............. 375/240.12 |
| 2013/0027581 A1* | 1/2013 | Price et al. ................ 348/229.1 |
| 2013/0121416 A1* | 5/2013 | He .................. H04N 19/00642 375/240.14 |

* cited by examiner

VIDEO CODING EFFICIENCY WITH CAMERA METADATA

CROSS-REFERENCE TO RELATED APPLICATION

The present application claims the benefit of U.S. provisional application Ser. No. 61/593,192, filed Jan. 31, 2012, entitled, "IMPROVING VIDEO CODING EFFICIENCY WITH CAMERA METADATA", the disclosure of which is incorporated herein by reference in its entirety.

BACKGROUND

Aspects of the present invention relate generally to the field of image processing, and more specifically to using camera metadata to improve video encoding and decoding processes.

In image processing systems, video or image data may be captured by a camera having a sensor. Conventional cameras convert the captured analog information from the sensor to digital data that is passed to an ISP for signal processing. The processed signal is then passed to a CPU or GPU for additional processing including filtering, encoding, image recognition, pattern or shape recognition, color enhancement, sharpening, or other image enhancing processes.

An encoder may code a source video sequence into a coded representation that has a smaller bit rate than does the source video and thereby achieve data compression. Using predictive coding techniques, some portions of a video stream may be coded independently (intra-coded I-frames) and some other portions may be coded with reference to other portions (inter-coded frames, e.g., P-frames or B-frames). Such coding often involves exploiting redundancy in the video data via temporal or spatial prediction, quantization of residuals and entropy coding. When a new transmission sequence is initiated, the first frame of the sequence is an I-frame. Subsequent frames may then be coded with reference to other frames in the sequence by temporal prediction, thereby achieving a higher level of compression and fewer bits per frame as compared to I-frames. Thus, the transmission of an I-frame requires a relatively large amount of data, and subsequently requires more bandwidth than the transmission of an inter-coded frame.

The resulting compressed data (bitstream) may then be transmitted to a decoding system via a channel. To recover the video data, the bitstream may be decompressed at a decoder by inverting the coding processes performed by the encoder, yielding a recovered decoded video sequence.

Previously coded frames, also known as reference frames, may be temporarily stored for future use in inter-frame coding. A reference frame cache stores frame data that may represent sources of prediction for later-processed frames. Both the encoder and decoder may keep reference frames in a cache or buffer. However, due to constraints in buffer sizes, a limited number of reference frames can be stored in the reference frame cache at a time. Frames that are referenced by other frames may be encoded before the referencing frames to avoid processing delays. Therefore, the coding order of a sequence of frames may be different than the display order of the same sequence.

Brightness or color differences between captured frames may be created by an exposure adjustment or other change in camera capture settings. However, global changes between captured images are often ignored by conventional video compression systems but the differences resulting from such global changes conventionally require the frame implementing the global change to be encoded as an I-frame. Thus, repeated exposure adjustments may require excessive intra-frame coding, thereby limiting the benefit gained by predictively coding transmitted frames.

Therefore, conventional methods for accommodating camera setting changes that affect the overall appearance of the captured video data is expensive in terms of time, processing resources, and transmission bandwidth. Accordingly, there is a need in the art to adapt to changing camera settings by recognizing and accommodating setting changes that alter the global appearance of captured video data between frames.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Systems and methods for using camera capture settings and related metadata to estimate the parameters for encoding a frame of the captured video data and to modify reference frames to accommodate detected camera setting changes is presented. According to an embodiment, nonlinear brightness and color changes in video capture may be modeled by performing a sequence of transform operations on the reference frames to further improve the coding efficiency of a compression system.

Figure 1:
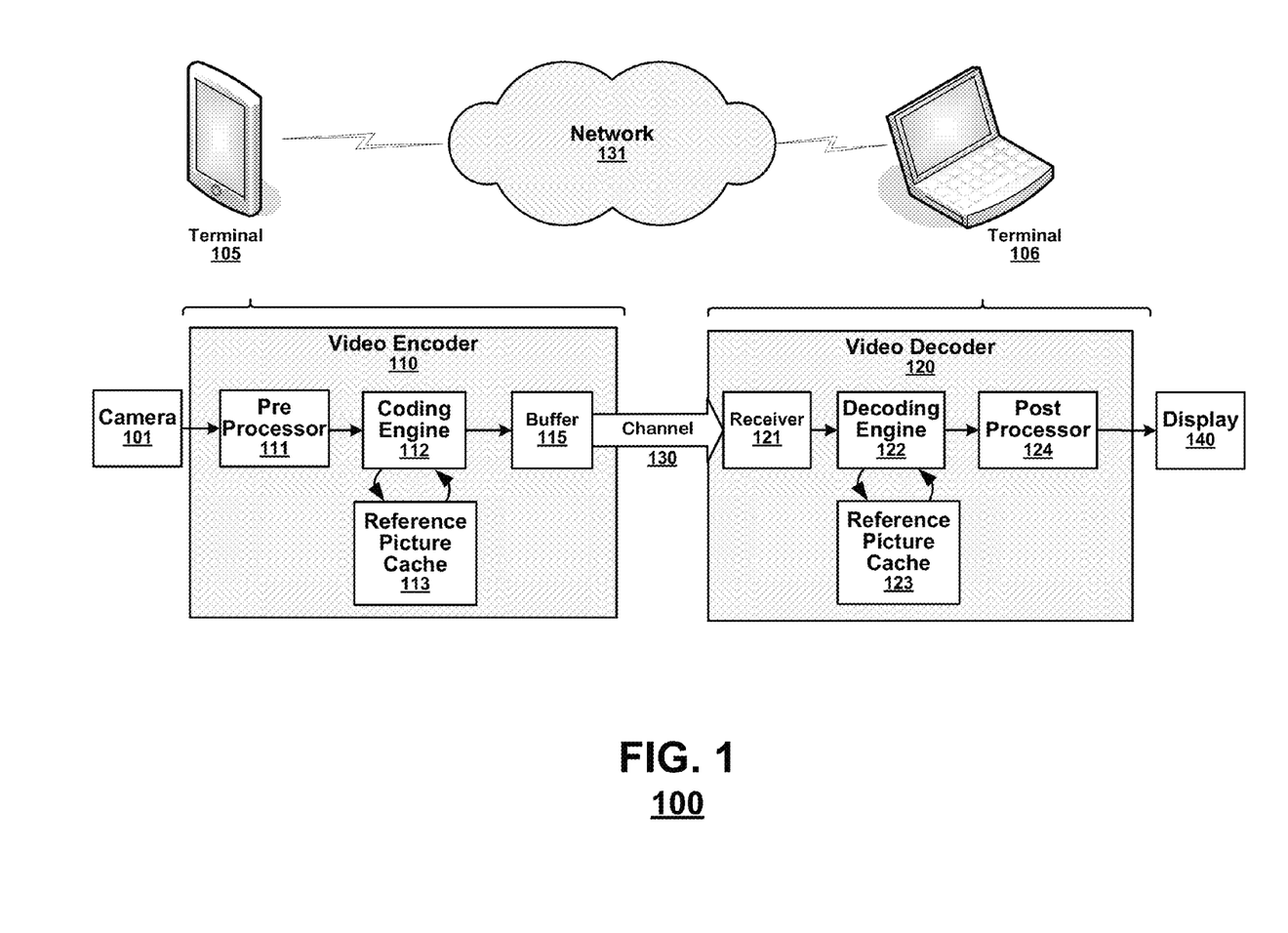
FIG. 1 is a simplified block diagram of an exemplary video coding system according to an embodiment of the present invention.

FIG. 1 is a simplified block diagram of an exemplary video coding system 100 according to an embodiment of the present invention. According to an embodiment, the coding system 100 may include terminals 105, 106 that communicate via a network 135. The terminals 105, 106 each may capture video data locally and code the video data for transmission to another terminal via the network. Each terminal may receive the coded video data of the other terminal from the network, decode the coded data and display the recovered video data. Video terminals may include personal computers (both desktop and laptop computers), tablet computers, handheld computing devices, computer servers, media players and/or dedicated video conferencing equipment.

As shown in FIG. 1, a pair of terminals are represented by the encoder system 110 and the decoder system 120 that are connected via a channel 130. The channel may deliver coded video data output from the encoder system 110 to the decoder system 120. The channel may be a storage device, such as an optical, magnetic or electrical storage device, or a communication channel formed by a computer network or a communication network, for example either a wired or wireless network.

As shown in FIG. 1, the encoder system 110 may include a pre-processor 111 that receives source video from a camera 101 or other source and may parse the source video into components for coding, an coding engine 112 that codes processed frames according to a variety of coding modes to achieve bandwidth compression, a reference frame cache 113 to store frame data that may represent sources of prediction for later-received video input to the video coding system, and a buffer 115 to store the coded data and combine the coded data and other data for transmission, for example camera metadata, transform coefficients, or other related information, into a common bit stream to be delivered by the transmission channel to a decoder or terminal.

According to an embodiment, the pre-processor 111 may additionally perform video processing operations on the video data including filtering operations or other kinds of processing operations that may improve efficiency of coding operations performed by the encoder 110. Typically, the pre-processor 111 may analyze and condition the source video for more efficient compression. For example, a video pre-processor 111 may perform noise filtering in an attempt to eliminate noise artifacts that may be present in the source video sequence.

The coding engine 112 may select from a variety of coding modes to code the video data, where each different coding mode yields a different level of compression, depending upon the content of the source video. Typically, the coding engine 112 may code the processed source video according to a known protocol such as H.263, H.264, MPEG-2 or MPEG-7. The coding engine 112 may code the processed source video according to a predetermined multi-stage coding protocol. Such video coding processes typically involve content prediction, residual computation, coefficient transforms, quantization and entropy coding. For example, common coding engines parse source video frames according to regular arrays of pixel data (e.g., 8×8 or 16×16 blocks), called "pixel blocks" herein, and may code the pixel blocks according to block prediction and calculation of prediction residuals, quantization and entropy coding. In some video coding systems, an encoder may conventionally code each portion of an input video sequence according to multiple coding techniques and examine the results to select a preferred coding mode for the respective portion.

In accordance with certain coding modes, the coding engine 112 may select a reference from the reference frame cache 113 for each pixel block of a current frame. The selected reference may closely match the pixel block of the current frame. Then by referencing an appropriately matching reference block, the current frame may be predictively encoded to eliminate spatial and temporal redundancies between coded frames.

In an embodiment, the encoder system 110 may receive metadata from the camera 101 that may affect coding engine 112 decisions. For example, the encoder system 110 may receive camera capture settings including exposure time, analog gain, digital gain, white balance gain, aperture, ISO setting, black point, white point, tone curve, etc. The metadata may be received for each frame or may be extrapolated from metadata received based on the capture time of the source frame. Metadata information may be used to modify reference frames to conform to the received metadata and detected camera-capture settings.

The encoder system 110 may transmit this camera metadata to the decoder system 120, for example, in logical channels established by the governing protocol for out-of-band data. As one example, used by the H.264 protocol, the encoder may transmit accumulated statistics in a supplemental enhancement information (SEI) channel specified by H.264. In such an embodiment, the buffer 115 represents processes to introduce the metadata in a logical channel corresponding to the SEI channel. When the present invention is to be used with protocols that do not specify such out-of-band channels, the buffer 115 may establish a separate logical channel for the metadata within the output channel 130. According to an embodiment, the encoder 110 may transmit the modified reference frame with the coded video data and/or the related metadata As shown in FIG. 1, the decoder system 120 may include a buffer 121 or demultipexer to receive the coded channel data and separate the coded video data from the metadata, a decoding engine 122 having access to reference data stored in a reference frame cache 123 that receives coded video data and inverts coding processes performed by the encoding engine 112, and a post-processor 124 that represents further processing stages (buffering, etc.) to output the final decoded video sequence to a display device 140.

According to an embodiment, the decoder system 120 may receive metadata in logical channels established by the governing protocol for out-of-band data. As one example, used by the H.264 protocol, the decoder may receive metadata in a supplemental enhancement information (SEI) channel specified by H.264. In such an embodiment, the buffer 121 represents processes to separate the metadata from a logical channel corresponding to the SEI channel. However, when the present invention is to be used with protocols that do not specify such out-of-band channels, the buffer 121 may separate the metadata from the encoded video data by utilizing a logical channel within the output channel 130. According to an embodiment, the decoder 120 may receive the modified reference frame with the coded video data and/or the related metadata.

The decoding engine 122 may parse the received coded video data to recover the original source video data, for example by decompressing the frames of a received video sequence by inverting coding operations performed by the encoder system 110. The decoding engine 122 may access the reference frame cache 123 to store frame data that may represent source blocks and sources of prediction for later-received frames.

As shown the coding system 100 supports video coding and decoding in one direction only. However, according to an embodiment, bidirectional communication may be achieved with an encoder and a decoder implemented at each terminal such that each terminal may capture video data at a local location and code the video data for transmission to another terminal via the network. Each terminal may receive the coded video data of the other terminal from the network, decode the coded data and display video data recovered therefrom.

Figure 2:
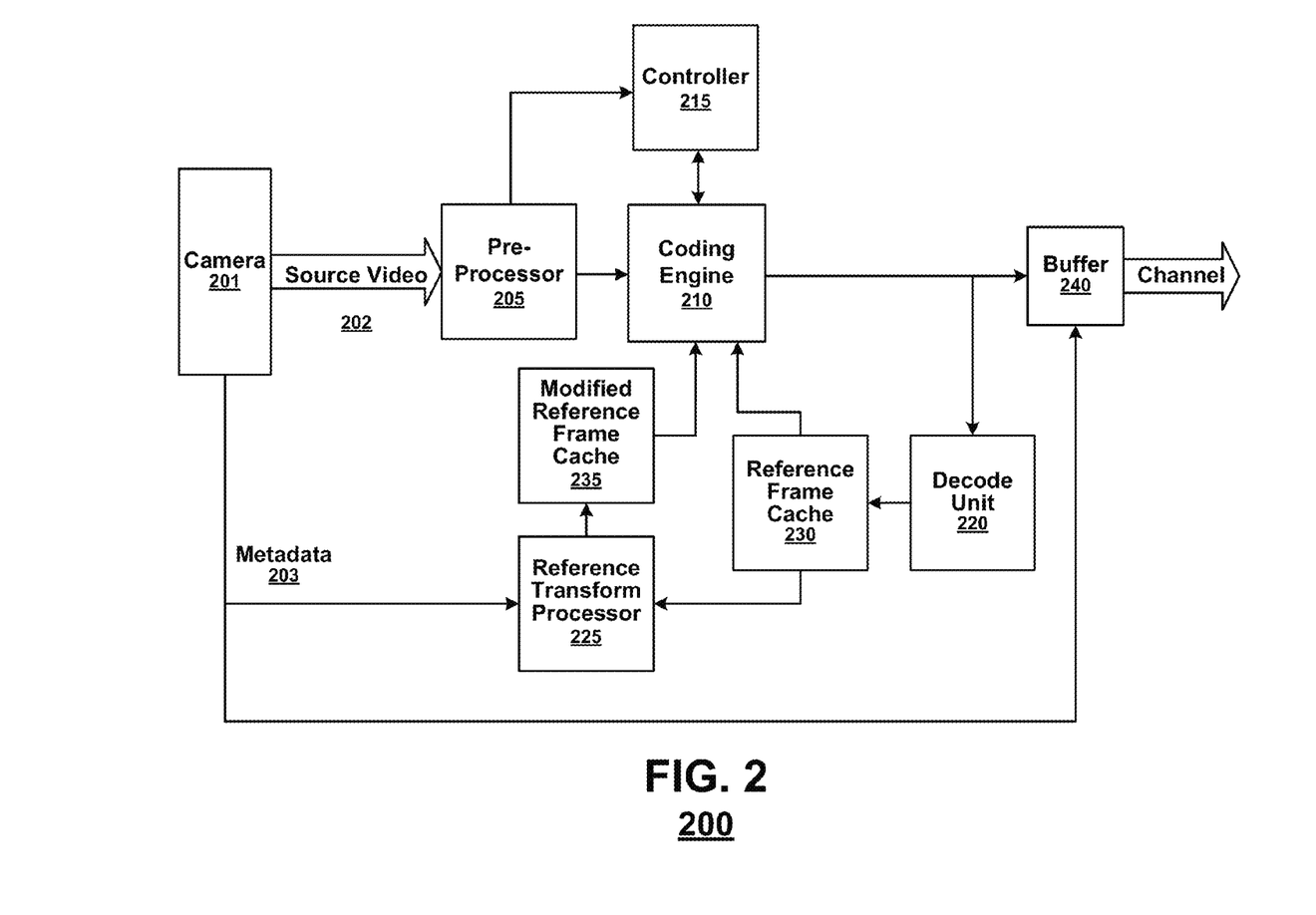
FIG. 2 is a simplified block diagram of an exemplary video encoder according to an embodiment of the present invention.

FIG. 2 is a simplified block diagram of an exemplary video encoder 200 according to an embodiment of the present invention. The video encoder 200 may include a pre-processor 205, a video encoding engine 210, a video decoding unit 220, and a coded video data buffer 240 as indicated above. According to an embodiment, the video encoder 200 may additionally include a controller 215, a reference frame cache 230, reference transform processor 225, and a modified reference frame cache 235.

As previously described, the pre-processor 205 may receive input video data 202 from the video source 201, such as a camera or storage device, separate the video data into frames, and prepare the frames for encoding. Then the controller 215 may receive the processed frames from the pre-processor 205 and determine appropriate coding modes for the processed frames. The controller 215 may also have access to reference frames stored in the reference frame cache 230 and modified reference frames stored in the modified reference frame cache 235. The controller 215 may additionally receive feedback from other components of the encoder 200 including for example the decode unit 220 and/or the output buffer 240 (not shown). For each pixel block in a frame, the controller 215 may select a coding mode to be utilized by the coding engine 210 and may control operation of the coding engine 210 to implement each coding mode by setting operational parameters. The coding engine 210 may receive video output from the pre-processor 205 and generate compressed video in accordance with the coding mode parameters received from the controller 215.

The reference frame cache 230 may store reconstructed frame data that may represent sources of prediction for later-received frames input to the video coding system. The reference transform processor 235 may receive the metadata and the reference frames and may modify or transform the reference frames as described herein. The modified reference frame cache 235 may store reference frames that have been modified to conform to the metadata and detected camera capture settings 203 received from the video data source 201. Then the modified reference frames may represent sources of prediction for later received frames captured with the detected camera capture settings corresponding to the received metadata 203.

The reference transform processor 225 may receive the metadata 203 from the camera or controller and original reference frames from the reference frame cache 230 and identify changes in the metadata 203 and associated camera settings that may indicate the traditional predictive coding techniques will not be effective. Then the reference transform processor 225 may instruct the creation of a modified reference frame that represents a reference frame that has been modified to be consistent with the camera capture settings of the current frame. The modified reference frame may be more consistent with the current frame than an unmodified reference frame. For example, the metadata 203 received from the source camera 201 may be associated with the capture time of the source video and received for each frame or may be extrapolated from multiple metadata measurement received based on the capture time of the source frame.

According to an embodiment, the modified reference frames may be created and discarded by the reference transform processor 225 as needed, without requiring a plurality of modified reference frames to be stored in a modified reference frame cache 235.

Figure 3:
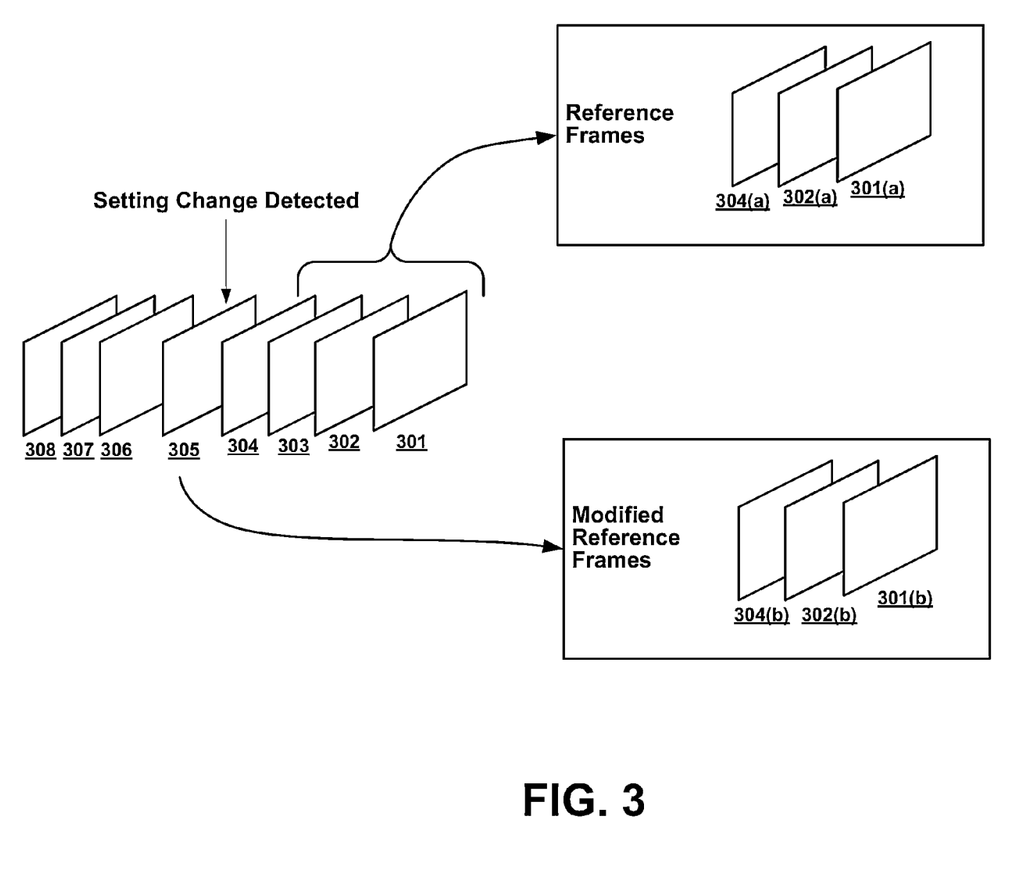
FIG. 3 illustrates an exemplary sequence of frames coded according to an embodiment of the present invention.

FIG. 3 illustrates an exemplary sequence of frames coded according to an embodiment of the present invention. As shown in FIG. 3, multiple frames 301-308 may be encoded and one or more of the coded and recovered frames may be stored in the reference frame cache as reference frames 301(a), 302(a), and 304(a). These frames may be coded with reference to the unmodified reference frames according to a predictive coding technique. Then, when a change in camera capture conditions is detected, as shown at frame 305, one or more of the stored reference frames 301(a), 302(a), or 304(a), may be modified or transformed to accommodate the detected condition change. Modified reference frames may be stored in a modified reference frame cache 301(b), 302(b), and 304(b). Each subsequent frame associated with the new capture setting may be coded with reference to the modified reference frames 301(b), 302(b), and 304(b).

According to an embodiment, the reference frames may be modified by applying a scale factor a and an offset b to the reference frame where the scale factor and offset may be calculated from the metadata. Then if a current frame is represented by FCUR(i,j), where (i,j) represents pixel coordinates within the frame, and a reference frame is represented by $F_{REF}(i,j)$, the modified reference frame is represented by Equation 1:

$$M(i,j) = a * F_{REF}(i,j) + b \qquad \text{EQ. 1}$$

Where a and b are the same for all coordinates (i,j) in the frame.

Then if N=A*D*E where A is the analog gain, D is the digital gain, and E is the exposure time for the camera during capture of the frame as indicated in the received metadata 203, by applying the capture setting (N) to the linear radiance value (R,G,B) for the pixel block, the luminance values (represented as Y in the YUV color space) may be calculated by Equation 2:

$$Y_{CUR} = 0.299*(f(w)_r*N_{CUR}*R) + 0.587(f(w)_g*N_{CUR}*G) + (0.114*f(w)_b)*N_{CUR}*B$$

$$Y_{REF} = 0.299*(f(w)'_r*N_{REF}*R) + 0.587(f(w)'_g*N_{REF}*G) + (0.114*f(w)'_b)*N_{REF}*B \qquad \text{EQ. 2}$$

Where $(w_r, w_g, w_b)$ and $(w'_r, w'_g, w'_b)$ are the white balance gains of each color channel (RGB) for the frame and f( ) is the tone curve for gamma correction of the luminance.

If the white balance is constant (or relatively so), f( ) can be approximated by Equation 3:

$$f(x) = x^{\frac{1}{\gamma}} \qquad \text{EQ. 3}$$

Then:

$$Y_{CUR} = Y_{REF} * \left(\frac{N_{CUR}}{N_{REF}}\right)^{\frac{1}{\gamma}} \qquad \text{EQ. 4}$$

And the scale factor a may be approximated with Equation 5:

$$a = \left(\frac{A_{CUR} + D_{CUR} + E_{CUR}}{A_{REF} + D_{REF} + E_{REF}}\right)^{\frac{1}{\gamma}} \qquad \text{EQ. 5}$$

Where γ represents the gamma correction. And offset b may be set to a constant value, or zero. The gamma correction for the luminance in many cases may be assumed to be 2.2.

Thus, the weighting factors may be calculated from the camera settings and metadata. The calculated weighted prediction parameters may be coded and transmitted to the decoder with the coded video data with or in the place of the transmitted metadata as described herein.

However, the linear calculations described assume that the white balance does not change between the reference frame and the current frame, and that the gamma factor may be represented by a simple exponential function. According to an embodiment, to derive modified reference frames that closely match the current frame, the reference frames may be reverse transformed and transformed using the metadata from the reference frame and the metadata from the current frame respectively.

To modify the reference frames, a frame in the YUV color space may be converted to the RGB color space. This results in: $R_{REF}(i,j), G_{REF}(i,j), B_{REF}(i,j)$. Then the RGB coordinates for the reference frame may be converted to linear radiance by a reverse transform as shown in Equation 6:

$$R_{REF_{linear}}(i,j) = \frac{1}{w_{\gamma'} N_{REF}} f_{REF}^{-1}(R_{REF}(i,j)) \quad \text{EQ. 6}$$

Where $f_{REF}(\ )$ is the tone curve function for the reference frame.

Then the forward transform may be applied to the transformed reference frame to get the modified frame in accordance with Equation 7:

$$R_{MOD_{REF}} = f_{CUR}(w_R * N_{CUR} * R_{REF_{linear}}(i,j))$$

$$B_{MOD_{REF}} = f_{CUR}(w_b * N_{CUR} * B_{REF_{linear}}(i,j)) \quad \text{EQ. 7}$$

Where $f_{CUR}(\ )$ is the tone curve function for the current frame. Then the modified reference frame may be converted from the RGB color space back to the YUV color space and stored for future reference.

Figure 4:
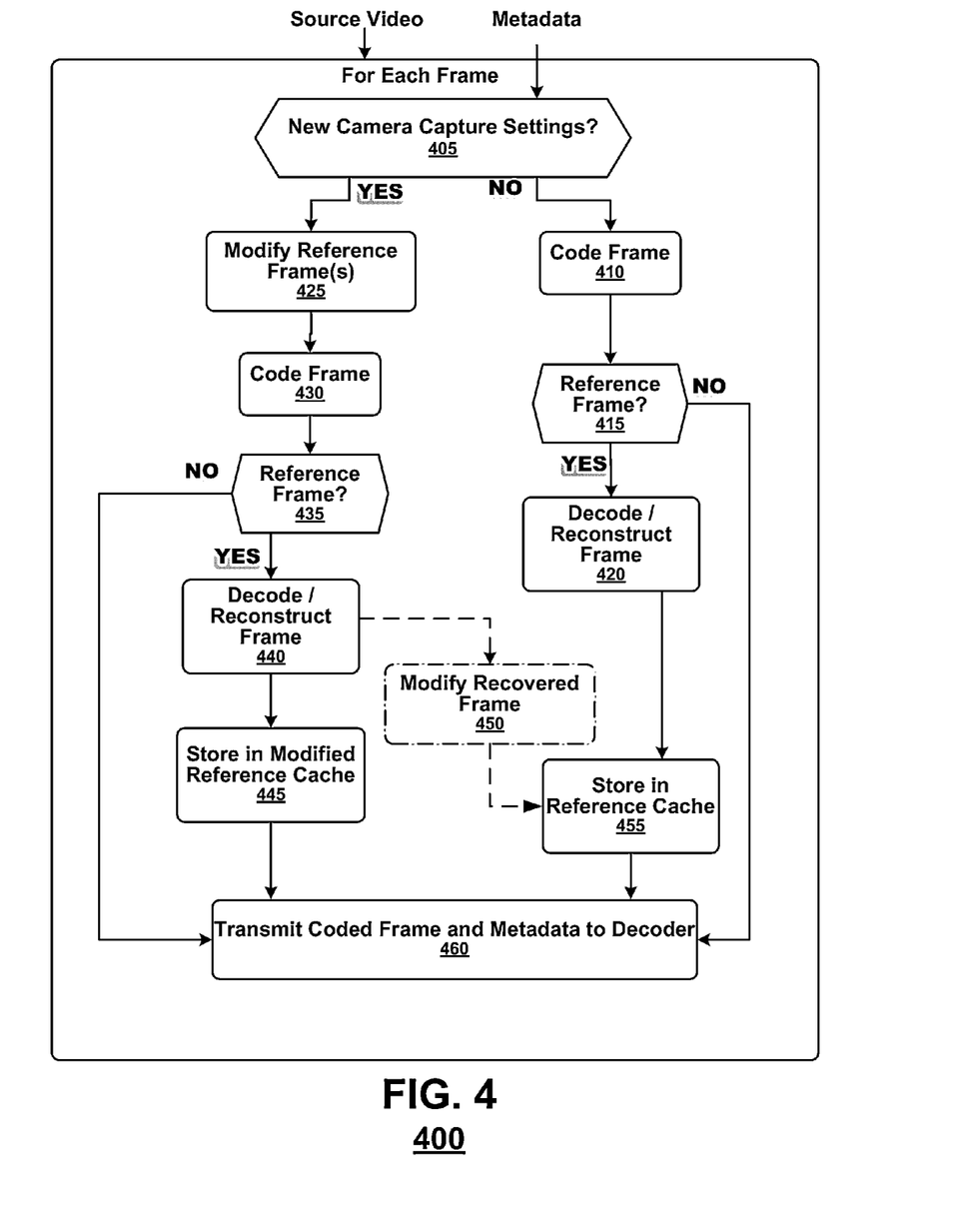
FIG. 4 is a simplified flow diagram illustrating an exemplary method for coding a sequence of frames according to an embodiment of the present invention.

FIG. 4 is a simplified flow diagram illustrating an exemplary method 400 for coding a sequence of frames according to an embodiment of the present invention. As shown in FIG. 4, source video may initially be received at an encoder. Additionally, camera capture setting data and related metadata for each frame may additionally be received or calculated at the encoder. Then, by processing the source video frame by frame, a change in the camera metadata may be detected that indicates that the current source frame will have different conditions than the reference frames stored in the reference cache (block 405). In some embodiments, a relevant change may be reflected by a single change to a relevant camera capture setting. In an embodiment, a relevant change may be reflected by a change in a combination of multiple different camera capture settings. In another embodiment, a relevant change may be determined by comparing a change in a camera capture setting to a predetermined threshold to confirm that the change is sufficient to warrant modifying one or more frames in the reference frame cache.

If there is no change in the camera capture settings, or a detected change is not sufficient to require reference frame modification, the current frame may coded using one or more unmodified reference frames according to conventional predictive coding techniques (block 410).

Then if the current frame may be used as a reference frame for encoding future received frames (block 415), the coded frame may be decoded and reconstructed using the unmodified reference frames as necessary (block 420). Reconstructed frames may then be stored in the reference frame cache (block 455).

However, if a relevant camera capture setting change is detected (block 405), one or more reference frames may be modified as if they were captured with the camera settings of the current frame (block 425). The current frame may then be coded using one or more modified reference frames according to conventional predictive coding techniques (block 430). According to an embodiment, only a stored reference frame that will be referenced during coding of the current frame may be modified. Alternatively, all or some other subset of the reference frames stored in the reference frame cache may be modified.

Then if the current frame may be used as a reference frame for encoding future received frames (block 435), the coded frame may be decoded and reconstructed using the modified reference frame(s) as necessary (block 440). Then the reconstructed frames may be stored in the modified reference frame cache (block 445).

According to an aspect of an embodiment, the reconstructed frame may be modified such that the modified reconstructed frame is consistent with the frames as if it was captured with the original camera capture settings (block 450). Then the modified reconstructed frame may be stored in the reference frame cache (block 455).

The coded video data and the corresponding metadata or transform coefficients may then be transmitted to a receiver, decoder, or stored (block 460). The metadata may be transmitted only with those frames for which a modified reference frame was utilized or according to an aspect of an embodiment, the metadata may be transmitted with each coded frame, regardless of whether a modified reference frame was utilized.

Figure 5:
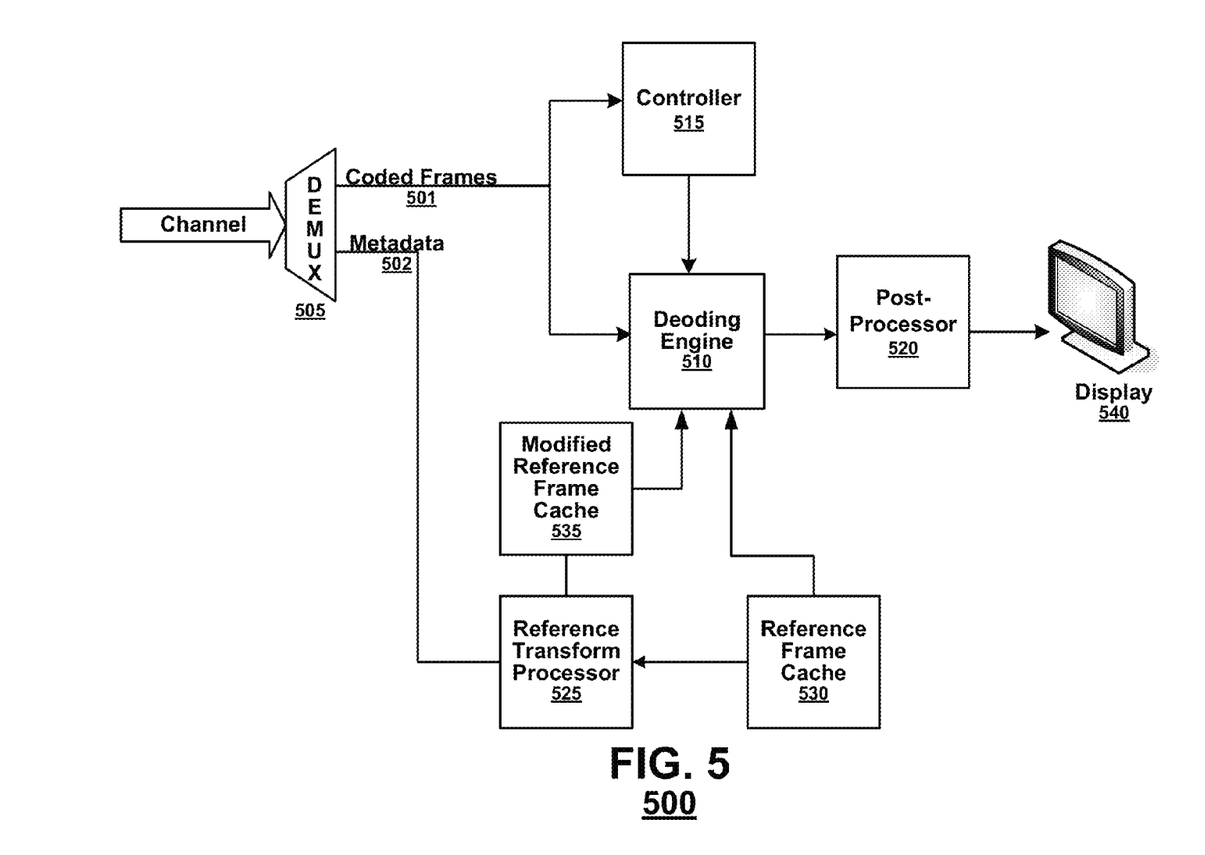
FIG. 5 is a simplified block diagram of an exemplary video decoder according to an embodiment of the present invention.

FIG. 5 is a simplified block diagram of an exemplary video decoder 500 according to an embodiment of the present invention. The system may include a demultiplexer (DEMUX) 505 that may receive and store coded video data received from the channel and separate the coded video data into multiple channels of data, a video decoding engine 510 to decode coded frames 501 by inverting coding processes performed at a video encoder and generating recovered video, a controller 515 to identify the characteristics of the coded video frames 501 and select a decoding mode for each frame, and a post-processor 520 that further processes and conditions the decoded video to be rendered for display on a display device 540.

According to an embodiment, the DEMUX 505 may distinguish the coded video frames 501 from the metadata 502 and route the different data to the video decoding engine 515 and the modified reference cache 535 respectively. The DEMUX 505 may receive the metadata in logical channels established by the governing protocol for out-of-band data. For example, the metadata 502 may be included in supplemental enhancement information (commonly, "SEI") messages received at the decoder 500 according to the H.264 coding protocol. In such an embodiment, the DEMUX 505 may represent processes to separate the metadata from a logical channel corresponding to the SEI channel. Alternatively, the decoder may receive such metadata in a video usability information (VUI) channel of H.264. When the present invention is to be used with protocols that do not specify such out-of-band channels, the DEMUX 505 may separate the metadata 502 from the encoded video frames 501 by utilizing a logical channel within the output channel.

The controller 515 may receive the coded video frames 501 from the DEMUX 505 and determine appropriate coding modes for the frames. The controller may additionally receive any metadata 502 received by the DEMUX 505 associated with the video frames and/or feedback from other components of the decoder 500, including the decoding engine 510 and the post processor 520 (not shown). The controller 515 may also have access to reference frames stored in the reference frame cache 530 and modified reference frames stored in the modified reference frame cache 535. For each frame or pixel block in each frame, the controller 515 may select a coding mode to be utilized by the coding engine 510 and may control operation of the decoding engine 510 to implement each coding mode by setting operational parameters.

The decoding engine 510 may receive coded video frames 501 output from the DEMUX 505 and generate recovered video in accordance with the decoding mode parameters received from the controller 515. The decoding engine 510 may use reference frames to reconstruct decoded frames including by using received motion information to identify reference blocks for reconstruction. The decoding engine 510 may search among the reference frames for stored decoded frames that exhibit strong correlation with the source pixel block. If a modified reference frame has been created for the source pixel block, the decoding engine 510 may search the modified reference cache 535. If no modified reference frame has been created for the source pixel block, the decoding engine 510 may search the original reference frame cache 530.

The reference frame cache 530 may store reconstructed frame data that may represent sources of prediction for later-received frames. The modified reference frame cache 535 may store reference frames that have been modified to conform to the received metadata 502. The received metadata may represent camera capture settings detected during capture of the original source video for each frame. According to an aspect of an embodiment, the received metadata 502 may represent transform coefficients associated with each frame such that stored reference frames may be transformed to reflect the camera capture settings associated with the frame. Then the modified reference frames may represent sources of prediction for later received frames captured with the detected camera capture settings corresponding to the received metadata 502.

The reference transform processor 525 may receive the metadata 502 from the DEMUX 505 and original reference frames from the reference frame cache 530 and identify information in the metadata that may indicate a modified reference frame was used to encode the frame. Then the reference transform processor 525 may instruct the creation of a modified reference frame that represents an original reference frame that has been modified to be consistent with the camera capture settings of the current frame. According to an embodiment, the modified reference frames may be created and discarded by the reference transform processor 525 as needed, without requiring a plurality of modified reference frames to be stored in a modified reference frame cache 535. Modified reference frames may be created as described above.

Figure 6:
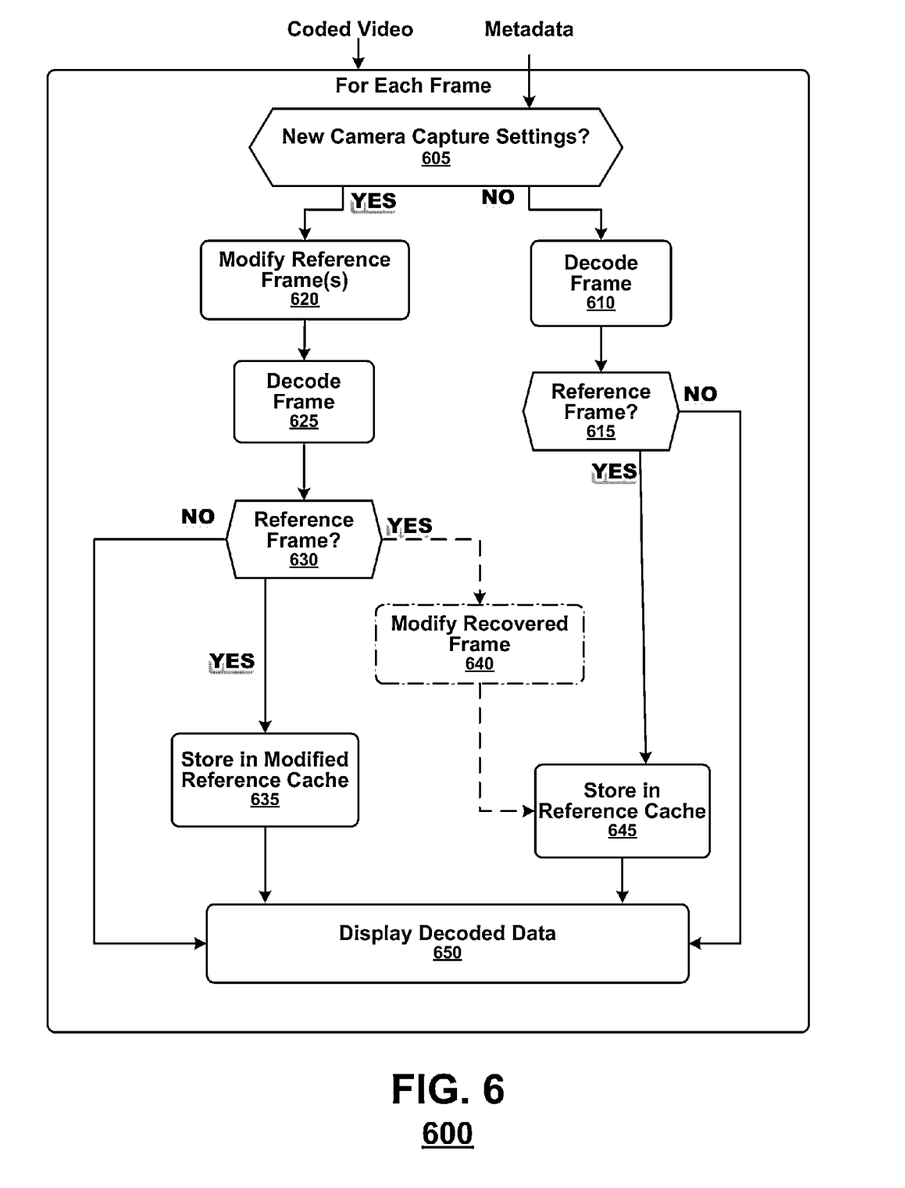
FIG. 6 is a simplified flow diagram illustrating an exemplary method for decoding coded video data according to an embodiment of the present invention.

FIG. 6 is a simplified flow diagram illustrating an exemplary method 600 for decoding coded video data according to an embodiment of the present invention. As shown in FIG. 6, coded video frames may initially be received at a decoder. Additionally, camera capture setting data and related metadata for each frame may additionally be received or calculated at the decoder. Then, for each frame, the metadata may indicate that the source of the current recovered frame was captured under different conditions than the reference frames stored in the reference frame cache (block 605). If the metadata indicates that there is no relevant change in the camera capture conditions, the current frame may decoded using one or more unmodified reference frames according to conventional predictive decoding techniques (block 610).

According to an embodiment, metadata may be received for each frame. Then the decoder would determine if there is a change in the metadata for which it would be appropriate to modify one or more reference frames. As previously noted, a relevant change may be reflected by a single change to a camera capture setting. In an embodiment, a relevant change may be reflected by a change in a combination of multiple different camera capture settings. In another embodiment, a relevant change may be determined by comparing an identified change in a camera capture setting to a predetermined threshold to confirm that the change is sufficient to warrant the modification.

Then, if the current recovered frame may be used as a reference frame for decoding future received frames (block 615), the current recovered frame may then be stored in the reference frame cache (block 645).

However, if the metadata indicates that there was no relevant change in the camera capture conditions for the current frame (block 605), one or more reference frames may be modified as if they were captured with the camera settings of the current frame (block 620). The current frame may then be decoded using one or more modified reference frames according to conventional predictive decoding techniques (block 625). Then if the current recovered frame may be used as a reference frame for decoding future frames (block 630), the current recovered frame may be stored in the modified reference frame cache (block 635).

According to an aspect of an embodiment, the current recovered frame may be modified such that the modified recovered frame is consistent with the frames in the reference frame cache as if it were captured with the original camera capture settings (block 640). Then the modified recovered frame may be stored in the reference frame cache (block 645).

The recovered video data may then be further processed and conditioned for display and displayed on a display device (block 650).

As discussed above, FIGS. 1, 2, and 5 illustrate functional block diagrams of an exemplary system according to an embodiment of the present invention. In implementation, the systems may be embodied as hardware, in which case, the illustrated blocks may correspond to circuit sub-systems within the systems. Alternatively, the components of the systems may be embodied as software, in which case, the blocks illustrated may correspond to program modules within software programs. In yet another embodiment, the systems may be hybrid systems involving both hardware circuit systems and software programs. For example, the decoding engine 510 of FIG. 5 may be provided as an application-specific integrated circuit while the post-processor 520 may be provided as software modules. Other implementations also may be used.

Moreover, not all of the functional blocks described herein need be provided or need be provided as separate units. For example, although FIG. 2 illustrates the components of an exemplary system, such as the pre-processor 205, controller 215, reference transform processor 225, and modified picture cache 235 as separate units, in one or more embodiments, some or all of them may be integrated. Similarly, some components may not be implemented as part of the image processing system. Such implementation details are immaterial to the operation of the present invention unless otherwise noted above.

Additionally, although FIGS. 4 and 6 illustrate exemplary methods, the order of operations may be altered or some operations skipped entirely. For example, although FIGS. 4 and 6 illustrate processing a single frame, multiple frames may be processed at the same time.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for processing video data, comprising:
    receiving at a controller an input sequence of frames of the video data;
    receiving at the controller metadata comprising capture settings for the frames;
    comparing the received capture settings for a pair of the frames to identify a relevant change in the received capture settings; and
    upon identifying the relevant change in the received capture settings:
    transforming a plurality of reference frames previously reconstructed from earlier coded frames and stored in a reference cache into new reference frames, the transforming comprising applying a scale factor and an offset to at least one reference frame, wherein the scale factor and offset are calculated from the relevant change in the received capture settings; and
    coding a new input frame, predictively by searching among the new reference frames for a prediction reference for the predictive coding.

2. The method of claim 1, further comprising:
    storing the new reference frames in a modified reference cache.

3. The method of claim 1, further comprising:
    decoding a coded frame to generate a recovered frame; and
    storing the recovered frame in a modified reference cache.

4. The method of claim 1, further comprising:
    decoding a coded frame to generate a recovered frame;
    modifying the recovered frame to produce a modified recovered frame; and
    storing the modified recovered frame in the reference cache.

5. The method of claim 4, wherein said modifying implements an inverse modification to a modification previously applied to the reference frame.

6. The method of claim 1, wherein said received capture settings comprise exposure time settings received from an imaging device.

7. The method of claim 1, wherein said received capture settings comprise one of analog or digital gain settings received from an imaging device.

8. The method of claim 1, wherein said received capture settings comprise white balance gain settings received from an imaging device.

9. The method of claim 1, wherein said received capture settings comprise aperture settings received from an imaging device.

10. The method of claim 1, further comprising:
    determining the received capture settings associated with a frame by extrapolating from a plurality of metadata measurements based on a capture time of a first frame of the input sequence of frames.

11. The method of claim 1, wherein said transforming further comprises applying a transform to the reference frames using weighted parameters calculated from the received capture settings.

12. A method for decoding coded video data, comprising:
    receiving at a decoder coded video data;
    receiving at the decoder metadata comprising capture settings for source video data of the coded video data; and
    when the metadata identifies a relevant change in the capture settings:
    transforming reference frames previously reconstructed from an earlier coded frame and stored in a reference cache into new reference frames based on the received metadata, the transforming comprising applying a scale factor and an offset to at least one reference frame that are calculated from the relevant change in the capture settings; and
    decoding a plurality of frames of the coded video data predictively by searching among the new reference frames for a prediction reference to generate a recovered frame.

13. The method of claim 12, further comprising:
    storing the new reference frames in a modified reference cache.

14. The method of claim 12, further comprising:
    decoding a coded frame to generate a recovered frame; and
    storing the recovered frame in a modified reference cache.

15. The method of claim 12, further comprising:
    modifying the recovered frame to produce a modified recovered frame; and
    storing the modified recovered frame in the reference cache.

16. A system comprising:
    a reference cache for storing a plurality of reference frames;
    a processor configured to receive an input sequence of frames of video data and metadata comprising capture settings for the video data, to compare the received capture settings for a pair of the frames to identify a relevant change in the received capture settings, and, upon identifying the relevant change in the received capture settings, to transform reference frames previously reconstructed from earlier coded frames and stored in the reference cache into new reference frames, the transforming comprising applying a scale factor and an offset to at least one reference frame, wherein the scale factor and offset are calculated from the relevant change in the received capture settings; and
    a coder to code a new input frame, predictively by searching among the new reference frames for a prediction reference for the predictive coding.

17. The system of claim 16, further comprising:
    a second reference cache for storing the new reference frames.

18. The system of claim 16, wherein the processor is further configured to decode the coded frame to generate a recovered frame, and to store the recovered frame in a modified reference cache.

19. The system of claim 16, wherein the processor is further configured to decode a coded frame to generate a recovered frame, to modify the recovered frame to produce a modified recovered frame, and to store the modified recovered frame in the reference cache.

20. The system of claim 19, wherein said modifying implements an inverse modification to a modification previously applied to the reference frame.

21. A system comprising:
a reference cache for storing a plurality of reference frames;
a processor configured to receive coded video data and metadata comprising capture settings for source video of the coded video data and, upon identifying a relevant change in the received capture settings, to transform reference frames previously reconstructed from earlier coded frames and stored in the reference cache into new reference frames by applying a scale factor and an offset to at least reference frame, wherein the scale factor and offset are calculated from the relevant change in the received capture settings; and
a decoder to decode a new input frame, predictively by searching among the new reference frames for a prediction reference to generate a recovered frame.

22. The system of claim 21, further comprising:
a second reference cache for storing the new reference frames.

23. The system of claim 21, further comprising:
a second reference cache for storing the recovered frame.

24. The system of claim 21, wherein the processor is further configured to modify the recovered frame to produce a modified recovered frame and store the modified recovered frame in the reference cache.

25. A non-transitory computer readable medium storing program instructions that, when executed by a processing device, cause the device to:
upon receipt of an input sequence of frames of video data and metadata comprising capture settings for the video data, compare the received capture settings for a pair of the frames to identify a relevant change in the received capture settings;
upon identifying the relevant change in the received capture settings, transform reference frames previously reconstructed from earlier coded frames and stored in a reference cache into new reference frames, the transform comprising applying a scale factor and an offset to at least one reference frame, wherein the scale factor and offset are calculated from the relevant change in the received capture settings; and
code a new input frame, predictively by searching among the new reference frames for a prediction reference for the predictive coding.

26. The non-transitory computer readable medium of claim 25, wherein the processing device is further configured to store the new reference frames in a modified reference cache.

27. The non-transitory computer readable medium of claim 25, wherein the processing device is further configured to decode a coded first frame to generate a recovered frame, and to store the recovered frame in a modified reference cache.

28. The non-transitory computer readable medium of claim 25, wherein the processing device is further configured to decode a coded first frame to generate a recovered frame, to modify the recovered frame to produce a modified recovered frame, and to store the modified recovered frame in the reference cache.

29. The non-transitory computer readable medium of claim 28, wherein said modifying implements an inverse modification to a modification previously applied to the reference frame.

30. A non-transitory computer readable medium storing program instructions that, when executed by a processing device, cause the device to:
upon receipt of input coded video data and metadata comprising capture settings for source video of the coded video data and when the metadata identifies a relevant change in the received capture settings, transform reference frames previously reconstructed from earlier coded frames and stored in a reference cache into new reference frames, the transform comprising applying a scale factor and an offset to at least one reference frame that are calculated from the relevant change in the capture settings; and
decode a new input frame, predictively by searching among the new reference frames for a predictive reference for the predictive decoding.

31. The non-transitory computer readable medium of claim 30, wherein the processing device is further configured to store the new reference frames in a modified reference cache.

32. The non-transitory computer readable medium of claim 30, wherein the processing device is further configured to store a recovered frame in a modified reference cache.

33. The non-transitory computer readable medium of claim 32, wherein the processing device is further configured to modify the recovered frame to produce a modified recovered frame and store the modified recovered frame in the reference cache.

* * * * *